United States Patent
Sunaba et al.

(10) Patent No.: US 10,239,075 B2
(45) Date of Patent: Mar. 26, 2019

(54) NOZZLE GUN AND LEVER LOCK MECHANISM

(71) Applicant: TAKAGI CO., LTD., Kitakyushu-shi, Fukuoka (JP)

(72) Inventors: Takayuki Sunaba, Kitakyushu (JP); Megumu Yasuda, Kitakyushu (JP)

(73) Assignee: Takagi Co., Ltd., Fukuoka (JP)

( * ) Notice: Subject to any disclaimer, the term of this patent is extended or adjusted under 35 U.S.C. 154(b) by 36 days.

(21) Appl. No.: 15/271,446

(22) Filed: Sep. 21, 2016

(65) Prior Publication Data
US 2017/0087574 A1 Mar. 30, 2017

(30) Foreign Application Priority Data
Sep. 28, 2015 (JP) .................................. 2015-189562

(51) Int. Cl.
*B05B 9/01* (2006.01)
*F16K 31/60* (2006.01)
(Continued)

(52) U.S. Cl.
CPC .............. *B05B 9/01* (2013.01); *F16K 31/602* (2013.01); *F16K 31/607* (2013.01); *B05B 12/0022* (2018.08); *B05B 15/62* (2018.02)

(58) Field of Classification Search
CPC ............ B05B 7/02–7/129; B05B 9/01; B05B 11/3059; B05B 12/002;
(Continued)

(56) References Cited

U.S. PATENT DOCUMENTS 2,787,295 A * 4/1957 Houghton ................ B67D 7/48
141/209
5,979,800 A 11/1999 Takagi
(Continued)

FOREIGN PATENT DOCUMENTS

JP 56-062151 U1 10/1979
JP 02-014765 1/1990
(Continued)

OTHER PUBLICATIONS

Notice of Allowance issued by the Japanese Patent Office for Japanese Patent Application No. 2015-189562 dated Oct. 11, 2016, 3 pages. (No translation).

*Primary Examiner* — Steven J Ganey
*Assistant Examiner* — Cody Lieuwen
(74) *Attorney, Agent, or Firm* — Haynes and Boone, LLP

(57) ABSTRACT

A nozzle gun includes a nozzle main body, an operating member attached to the nozzle main body to be movable toward and away from the nozzle main body, and a stopper attached to the nozzle main body to be pivotable between a locked position and a non-lock position and having a locking portion and receptacles, wherein when the operating member is moved toward the nozzle main body and the stopper is placed in the locked position, the locking portion engages with the operating member to prevent the operating member from moving away from the nozzle main body, when the stopper is in the non-lock position, the locking portion does not engage with the operating member, and when the operating member is moved toward the nozzle main body with the stopper in the non-lock position, the operating member presses the receptacles to cause the stopper to pivot into the locked position.

6 Claims, 13 Drawing Sheets

(51) Int. Cl.
*B05B 15/62* (2018.01)
*B05B 12/00* (2018.01)

(58) Field of Classification Search
CPC .. B05B 12/0022–12/0026; F16K 31/60; F16K 31/602; F16K 31/605; F16K 31/607
USPC ................ 239/154, 525–532, 583, 586; 251/89–116
See application file for complete search history.

(56) References Cited

U.S. PATENT DOCUMENTS

| | | | |
|---|---|---|---|
| 2009/0184179 A1* | 7/2009 | Hsueh | B05B 12/002 239/525 |
| 2013/0168471 A1* | 7/2013 | Chen | B05B 9/01 239/526 |
| 2013/0193236 A1* | 8/2013 | Ye | B05B 9/01 239/526 |

FOREIGN PATENT DOCUMENTS

| | | |
|---|---|---|
| JP | 03-128446 U1 | 12/1991 |
| JP | 07-021237 Y | 5/1995 |
| JP | 08-001049 A | 1/1996 |
| JP | 2005138056 A | 6/2005 |
| JP | 2008-0506896 A | 3/2008 |
| JP | 4482832 B | 6/2010 |
| JP | 4789143 B | 10/2011 |
| JP | 5583104 B | 9/2014 |
| JP | 5607328 B | 10/2014 |
| JP | 5749661 B | 7/2015 |
| WO | WO 8801601 A1 | 3/1988 |

\* cited by examiner

NOZZLE GUN AND LEVER LOCK MECHANISM

CROSS-REFERENCE

This application claims the benefit of the filing date of, and priority to, Japanese patent application number 2015-189562, filed Sep. 28, 2015, the entire disclosure of which is hereby incorporated herein by reference.

BACKGROUND

Technical Field

The present invention relates to nozzle guns to be used as water spray nozzles, refueling nozzles, or air nozzles, the water spray nozzles being used for spraying water mainly in the household such as in gardening, cleaning, or farming. In particular, the present invention relates to nozzle guns operated while being held by a user's hand.

The present invention also relates to lever lock mechanisms used, for example, in the nozzle guns.

Related Art

Nozzle guns for spraying fluids are used in industry and in households for various applications.

In the household, a water spray nozzle, which is attached to the end of a hose and enables switching between spraying and stopping water at will, is widely used, for example, in gardening, farming, and cleaning. Such a water spray nozzle receives water from a water supply facility such as a tap through the hose and sprays water from a discharge outlet formed on a distal end of the water spray nozzle.

A conventional water spray nozzle includes a flow path for water formed inside a nozzle main body for connecting a proximal inlet and a distal discharge outlet. The flow path has an on-off valve including a valve seat and a valve body disposed in the flow path, and an operating lever is attached to the front of the nozzle main body so as to be capable of moving toward and away from the nozzle main body. In conjunction with the operating lever moving toward and away from the main body, the valve body moves toward and away from the valve seat and opens and closes the on-off valve. (See, for example, JP 08-1049 A.)

Some such conventional water spray nozzles are provided with a lock mechanism that is capable of maintaining the spraying of water by holding the operating lever in place without the user having to keep the operating lever squeezed.

JP 08-1049 A describes a water spray nozzle that has a locking ring attached to a nozzle main body and is capable of preventing an operating lever from moving away from the nozzle main body by the locking ring engaging with the operating lever with the operating lever in a squeezed position.

The water spray nozzle in JP 08-1049 A requires the user to operate the locking ring with one hand while squeezing the operating lever with the other hand, thereby inconveniently occupying both hands when locking and unlocking the operating lever.

JP 4482832 B1 describes a lock mechanism that includes an arm attached to a nozzle main body and projecting toward an operating lever, and a cam attached to the operating lever. In this lock mechanism, the user squeezes the operating lever to cause a locking strip provided on the arm to slide along a slideway formed on a side surface of the cam as the operating lever moves toward the nozzle main body and to lock into a locking recess recessed into the slideway. The distance between the nozzle main body and the operating lever is thus maintained and the operating lever can be prevented from moving away from the nozzle main body. Squeezing the operating lever again from the locked condition in which the locking strip is locked into the locking recess releases the lock and the on-off valve returns to a closed condition.

The water spray nozzle in JP 4482832 B1 always locks the valve in an open condition every time the operating lever is squeezed from the valve closed condition and is inconvenient when the user wishes to spray water without using the lock.

Further, the arm and the cam, which are components necessary for the lock mechanism, are disposed inside the operating lever. This makes component replacements difficult in the event of breakage.

JP 4789143 B1 describes a water spray nozzle having a stopper that is retained between a nozzle main body and an operating lever, that automatically engages with the operating lever when the operating lever is squeezed, and that prevents the operating lever from moving away from the nozzle main body.

This water spray nozzle is provided with lock release means for releasing the engagement between the stopper and the operating lever by pressing a push button attached to the operating lever such that the push button presses the stopper.

Unfortunately, the water spray nozzle in JP 4789143 B1 requires a special push button to release the lock, and this configuration increases complexity of the device.

PRIOR ART DOCUMENTS
JP 08-1049 A
JP 4482832 B1
JP 4789143 B1

SUMMARY

The present invention has been invented to solve the above problems and aims to provide a nozzle gun and a lever lock mechanism which have improved convenience of locking and unlocking operations.

The present invention also aims to provide a nozzle gun that prevents breakage of a stopper used for locking.

In the present invention, means for solving the above problems is described below.

In a first aspect, a nozzle gun includes: a nozzle main body having a flow path through which a fluid passes and a discharge outlet formed on a distal end of the flow path; an operating member attached to the nozzle main body to be movable toward and away from the nozzle main body; an on-off valve disposed along the flow path and configured to open and close the flow path according to a relative position of the operating member with respect to the nozzle main body; a stopper attached to the nozzle main body to be pivotable between a locked position and a non-lock position, the stopper having a locking portion, and receptacles disposed on a movement trajectory of the operating member; and pivoting guide portions provided on the nozzle main body, wherein when the operating member is moved toward the nozzle main body and places the stopper in the locked position, the locking portion engages with the operating member to prevent the operating member from moving away from the nozzle main body, when the stopper is in the non-lock position, the locking portion does not engage with the operating member and the operating member is capable of moving away from the nozzle main body, and when the operating member is moved toward the nozzle main body with the stopper in the non-lock position, the receptacles are pressed by the operating member to cause the stopper to pivot into the locked position while the stopper abuts on the pivoting guide portions.

In a second aspect, the stopper is capable of pivoting to an opposite side of the non-lock position into a retracted position with respect to the locked position, and the nozzle main body is provided with a retention portion on which the stopper abuts when the stopper is in the retracted position to secure the retracted position.

In a third aspect, when the operating member is moved toward the nozzle main body from a condition in which the operating member is in a position spaced from the nozzle main body and the stopper is in the locked position, the operating member causes the stopper to pivot due to a fact that the direction of the operating member abutting on and pressing the stopper is eccentric relative to a central axis of pivot of the stopper.

In a fourth aspect, the nozzle main body is further provided with a stopper restraining portion configured to abut on the stopper to prevent the stopper from rattling in a direction intersecting with a direction of pivot of the stopper.

In a fifth aspect, when the stopper is in the locked position, the stopper is prevented from pivoting into the non-lock position under its own weight by the frictional force between the stopper and the nozzle main body.

In a sixth aspect, a lever lock mechanism includes: a main body; an operating member attached to the main body to be movable toward and away from the main body; a biasing member configured to bias the operating member in a direction moving away from the main body; a stopper attached to the main body to be pivotable between a locked position and a non-lock position, the stopper having a locking portion, and receptacles disposed on a movement trajectory of the operating member; and pivoting guide portions provided on the main body, wherein when the operating member is moved toward the main body and places the stopper in the locked position, the locking portion engages with the operating member to prevent the operating member from moving away from the main body, when the stopper is in the non-lock position, the locking portion does not engage with the operating member and the operating member is capable of moving away from the main body, and when the operating member is moved toward the main body with the stopper in the non-lock position, the receptacles are pressed by the operating member to cause the stopper to pivot into the locked position while the stopper abuts on the pivoting guide portions.

According to a first aspect of the present invention, the stopper includes the receptacles disposed on the movement trajectory of the operating member. Moving the operating member toward the nozzle main body when the stopper is in the non-lock position causes the receptacles to be pressed by the operating member and thus the stopper to pivot into the locked position while the stopper abuts on the pivoting guide portions provided on the nozzle main body. Consequently, simply moving the operating member toward the nozzle main body automatically moves the stopper into the locked position and locks the operating member at a position close to the nozzle main body.

According to a second aspect of the present invention, the stopper is capable of pivoting to the opposite side of the non-lock position into the retracted position with respect to the locked position. Further, the nozzle main body is provided with a retention portion on which the stopper abuts in the retracted position to secure the retracted position. This configuration enables a user to optionally choose to manually operate adjustment of the position of the operating member without using locking by the stopper.

According to a third aspect of the present invention, moving the operating member toward the nozzle main body from the condition in which the operating member is in the position spaced from the nozzle main body and the stopper is in the locked position causes the operating member to cause the stopper to pivot due to a fact that the direction of the operating member abutting on and pressing the stopper is eccentric relative to the central axis of pivot of the stopper. The stopper is thus reliably prevented from being broken by being sandwiched between the nozzle main body and the operating member.

According to a fourth aspect of the present invention, the nozzle main body is provided with a stopper restraining portion that abuts on the stopper to prevent the stopper from rattling in the direction transverse to the direction of pivot of the stopper. Thus, the operating lever is prevented from not being able to be locked and from being broken by the rattling of the stopper.

According to a fifth aspect of the present invention, when the stopper is in the locked position, the stopper is inhibited from pivoting into the non-lock position under its own weight by the frictional force between the stopper and the nozzle main body. Thus, the operating lever can be reliably locked by the stopper after the operating lever is moved toward the nozzle main body.

According to a sixth aspect of the present invention, the stopper includes the receptacles disposed on the movement trajectory of the operating member. Moving the operating member toward the main body when the stopper is in the non-lock position causes the receptacles to be pressed by the operating member and thus the stopper to pivot into the locked position while the stopper abuts on the pivoting guide portions provided on the main body. Consequently, simply moving the operating member toward the main body automatically moves the stopper into the locked position and locks the operating member at a position close to the main body.

DETAILED DESCRIPTION

A water spray nozzle according to a first embodiment will be described hereinafter as an example of a nozzle gun according to the present invention.

This water spray nozzle 1 is an instrument for spraying water in gardening, farming, cleaning, or other applications, by being connected, through a hose, to an end of a water supply facility such as a tap and is used by being held in a user's hand.

The present invention can be used for all nozzle guns that switch between discharging and stopping the discharge of a fluid by the user squeezing an operating lever, such as refueling nozzles used, for example, in gas stations, and air nozzles for ejecting gas other than water spray nozzles.

Figure 1:
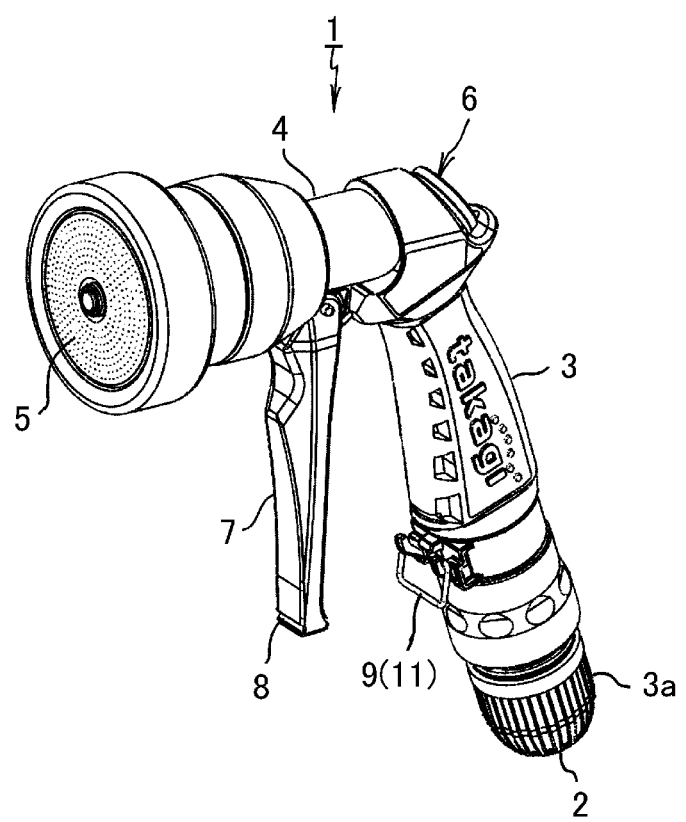
FIG. 1 is a perspective view showing a water spray nozzle according to the present invention.

As shown in FIG. 1, the water spray nozzle 1 has a nozzle main body 6 that is formed generally in a bent shape such as an L-shape, a dogleg shape, or a pistol shape. The nozzle main body 6 includes a substantially cylindrical grip portion 3 extending upward from a hose connector 3a having a connection port 2 which is connected, for example, to a hose and introduces water, and a nozzle portion 4 that extends forward from an upper end of the grip portion 3 and has a discharge outlet 5 on a distal end.

Front-back, right-left, and up-down directions are discussed herein based on the state in which a user holds the water spray nozzle 1. In this case, the orientation of the discharge outlet 5 is the front and the orientation of the connection port 2 is inclined slightly backward from directly downward.

Inside the nozzle main body 6, a flow path of water (not shown) is formed extending from the connection port 2 to the discharge outlet 5.

As shown in FIG. 1, the grip portion 3 is substantially cylindrical and extends upward from the hose connector 3a, which is to be connected to a hose. The grip portion 3 is handled held in the user's hand.

The orientation of the grip portion 3 may be vertical or may extend upward at an angle as shown in FIG. 1.

The nozzle portion 4 is substantially cylindrical and extends forward from the upper end of the grip portion 3. The nozzle portion 4 has the discharge outlet 5 on the distal end.

This water spray nozzle 1 has an on-off valve along the flow path of the nozzle main body 6 for switching between passing and shutting off water.

The on-off valve is provided between the grip portion 3 and the nozzle portion 4.

Figure 13:
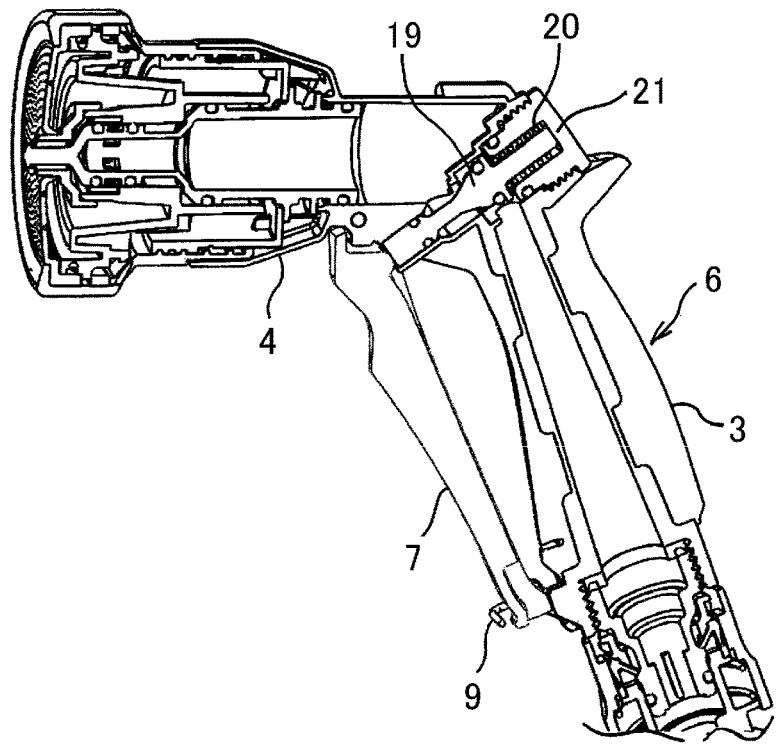
FIG. 13 is a cross-sectional illustrative view showing the water spray nozzle according to a third embodiment of the present invention.

At the position where the nozzle main body 6 bends, a water inlet from the grip portion 3 to the nozzle portion 4 serves as a valve seat, and a valve body is biased against this valve seat by a coil spring, which is an elastic member (see, FIG. 13).

A condition in which the valve seat is closed by the valve body is a valve closed condition in which water does not flow downstream.

A condition in which the valve body is separated from the valve seat against the biasing force of the coil spring is a valve open condition in which water flows from the grip portion 3 into the nozzle portion 4 and is sprayed from the discharge outlet 5.

One end of the valve body projects forward and downward outside the nozzle main body 6, and depressing this portion toward the inside of the nozzle main body 6 causes the valve body to be separated from the valve seat against the biasing force of the coil spring (see, FIG. 13).

Figure 2:
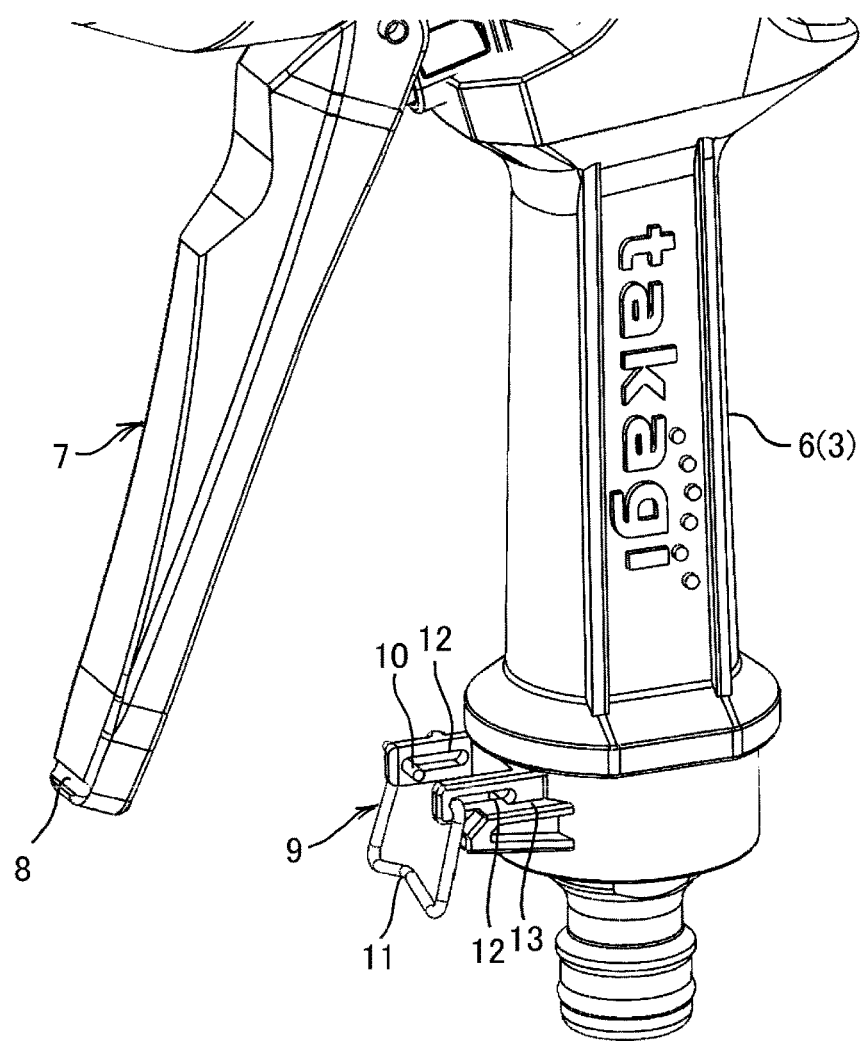
FIG. 2 is a partly enlarged view showing a valve closed condition of the water spray nozzle according to a first embodiment of the present invention.

As shown in FIGS. 1 and 2, an operating lever 7 is attached to a lower part of the nozzle portion 4. The operating lever 7 is an operating member for operating the valve body. The operating lever 7 is attached to the lower part of the nozzle portion 4 with the upper end being a fixed end and a lower end being a free end. Thus, the operating lever 7 is pivotable in front and back directions by the user squeezing the operating lever 7 with the hand holding the grip portion 3.

On an upper part of the operating lever 7, a projection is provided for depressing the end of the valve body (see FIG. 13).

In a natural state, the water spray nozzle 1 is in the valve closed condition by the biasing force of the coil spring and the operating lever is moved away from the grip portion 3.

When the user squeezes the operating lever 7 and moves the operating lever 7 toward the grip portion 3, the operating lever 7 depresses the valve body to separate the valve body from the valve seat against the biasing force of the coil spring and achieves the valve open condition.

When the user releases the hold on the operating lever 7 from the valve open condition, the water spray nozzle 1 returns to the valve closed condition by the biasing force of the coil spring.

Materials such as metal, resin, or rubber can be used for the operating lever 7.

Of these, it is preferable to use resin with excellent strength or metal.

Of these, it is more preferable to use resin, which is cheap and has excellent productivity.

Among resins, a thermoplastic resin, which can be molded easily is preferable.

Among thermoplastic resins, polypropylene (PP), acrylonitrile butadiene styrene copolymerized resin (ABS), or polyacetal (POM), which can easily be molded, are particularly preferable.

Of these, PP, which is cheap and has excellent strength, is particularly preferable.

In the first embodiment, PP has been used.

As shown in FIG. 2, on the front lower face of the operating lever 7, a grooved lock recess 8 extending from left to right is formed.

As shown in FIGS. 2 to 5, a stopper 9 is a member having a part of one side of a square frame cut away. Edges of both sides of the cut-away part are receptacles 10, 10, and an opposite side thereof is a locking portion 11.

Although the first embodiment as shown in FIG. 2 has the locking portion recessed toward the inside of the stopper 9, the locking portion may be formed to be straight (see, FIG. 6) or may be formed to bulge outward.

In the case of recessing or bulging the locking portion, the locking portion may also be formed in an arc or other gently curving shape other than a bent shape as shown in FIG. 2. Further, the entirety of the locking portion may be recessed or bulged as shown in FIG. 2, or only a part of the locking portion may be recessed or bulged.

Materials such as metal or resin can be used for the stopper 9.

Of these, metal is preferable in that metal is less susceptible to plastic deformation under load during use.

Among metals, rust resistant stainless steel (SUS) is preferable.

In the first embodiment, SUS has been used.

As shown in FIG. 2, the receptacles 10 of the stopper 9 fit into rails 12, 12 that extend from front to back and are formed on a pair of left and right members that project forward from the grip portion 3 of the nozzle main body 6.

This configuration enables the stopper 9 to slide back and forth between a front position and a back position along the rails 12.

As shown in FIGS. 2 to 5, on outer left and outer right of the rails 12 are a pair of pivoting guide portions 13, 13 that project forward from the nozzle main body 6.

Front ends of the pivoting guide portions 13 are positioned behind front ends of the rails 12.

In a position at back ends of the rails 12, upper surfaces of the pivoting guide portions 13 are nearly horizontal planes with the height of the upper surfaces of the pivoting guide portions 13 being substantially equal to lower ends of the rails 12.

In the middle of the front ends and back ends of the rails 12, the upper surfaces of the pivoting guide portions 13 are inclined with front sides gradually descending.

Materials such as metal or resin can be used for the frame parts of the rails 12 and the pivoting guide portions 13, which abut on the stopper 9, of the nozzle main body 6.

Of these, metal, PP, ABS, or POM, which have excellent resistance to degradation due to weathering and shock resistance, are preferable.

Among metals, forming by die casting using zinc is preferable from the perspective of moldability.

Among PP, ABS resin, and POM, ABS, which has a low shrinkage rate during molding and has excellent moldability, is preferable.

In the first embodiment, the rails 12 and the pivoting guide portions 13 have been formed by die casting using zinc.

When in the front position, the stopper 9 can freely pivot about the receptacles 10 from a non-lock position (FIG. 2) in which the locking portion 11 hangs downward to a retracted position (see, FIG. 11) in which the locking portion 11 points directly upward via a locked position (see, FIG. 4) in which the locking portion 11 projects forward.

In the front position, the stopper 9 is pivotable as described above. However, in a typical use by the user, that is, with the hose connector 3a pointing substantially downward and the discharge outlet 5 pointing forward, the locking portion 11 pivots under its own weight and takes the non-lock position in a natural state.

In the water spray nozzle 1 of the first embodiment, when the user squeezes the operating lever 7 from the valve closed condition as shown in FIG. 2, the operating lever 7 pivots backward and moves toward the nozzle main body 6.

The operating lever 7 then moves in a trajectory that fits exactly between the left and right rails 12, 12.

Figure 3:
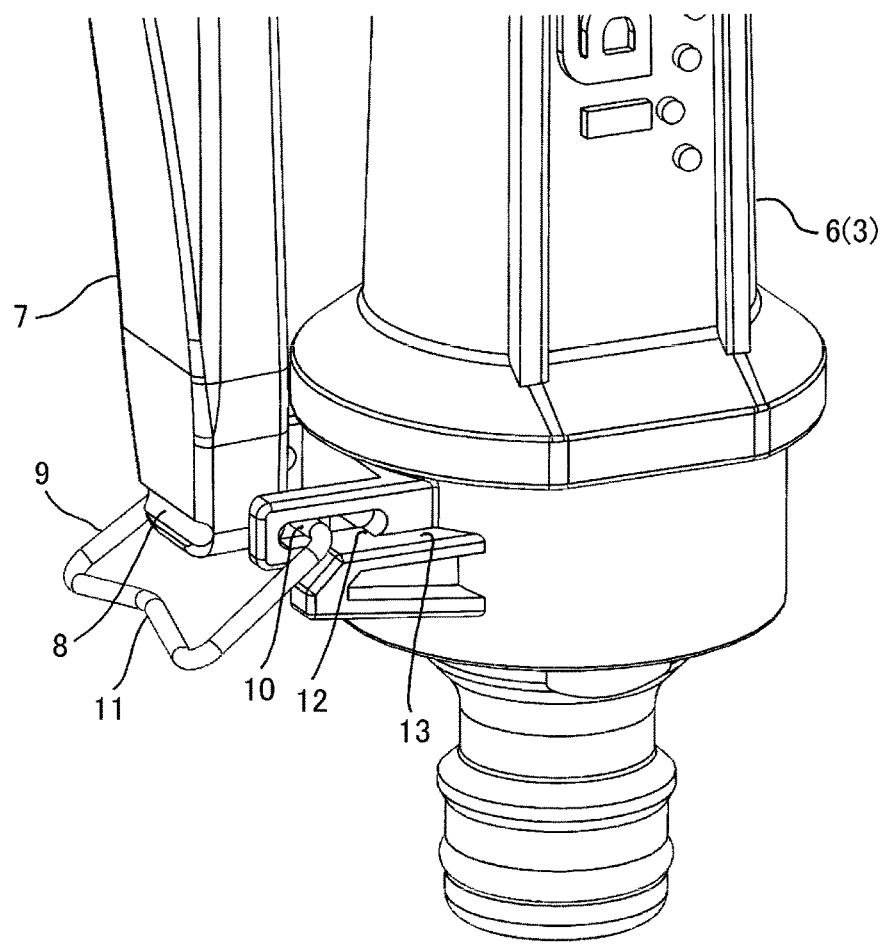
FIG. 3 is a partly enlarged view showing pivotal movement of a stopper by an operating lever of the water spray nozzle.

Thus, even when the receptacles 10 of the stopper 9 are in the front position, the receptacles 10, which are on a movement trajectory of the operating lever 7, are pressed by the operating lever 7 and slide into the back position (FIG. 3). In sliding from the front position to the back position, the stopper 9 abuts on the pivoting guide portions 13 and automatically pivots from the non-lock position to the locked position. The locking portion 11 slips under the operating lever 7 that has been moved toward the nozzle main body 6, and is positioned in front of the operating lever 7 when the stopper 9 is in the locked position (FIG. 4).

Figure 4:
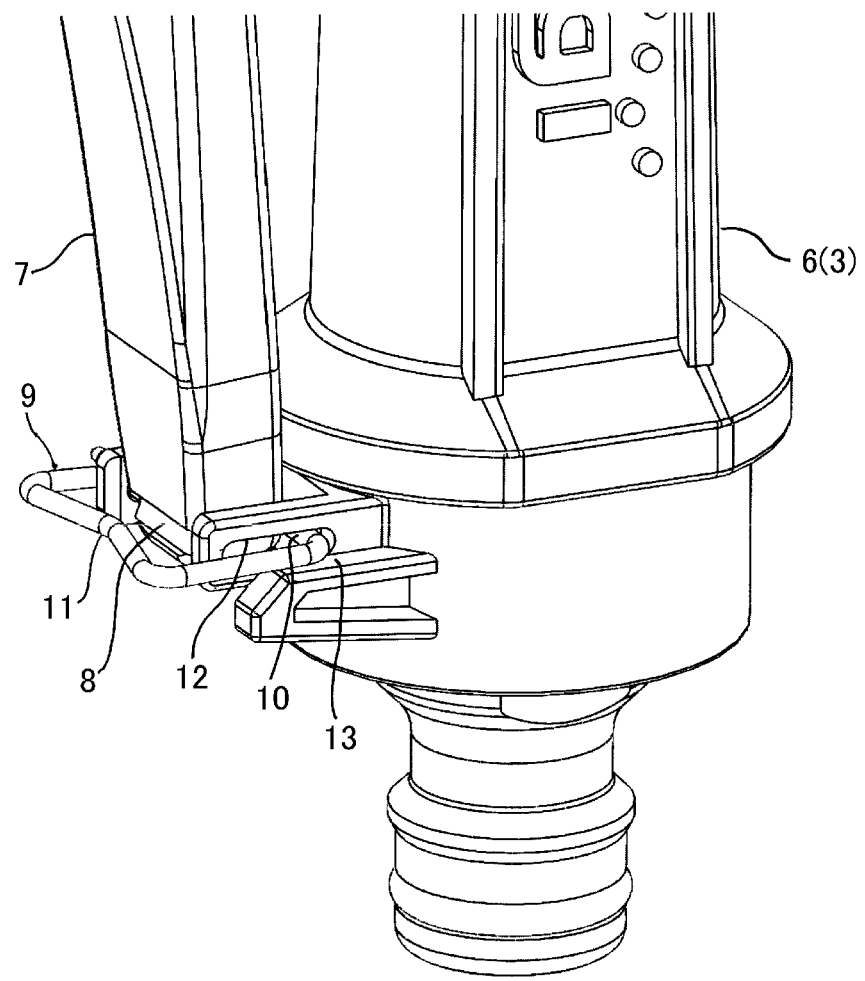
FIG. 4 is a partly enlarged view showing the stopper moved into a locked position by the operating lever of the water spray nozzle.

In the back position, the stopper 9 is kept in the locked position by riding onto the horizontal planes of the pivoting guide portions 13, and this prevents the stopper 9 from assuming the non-lock position in which the locking portion 11 hangs down (FIG. 4).

Although pivoting of the stopper 9 into the upward pointing retracted position is not regulated even when the stopper 9 is in the back position, in the natural state, the stopper 9 is kept in the locked position by the weight of the locking portion 11.

Figure 5:
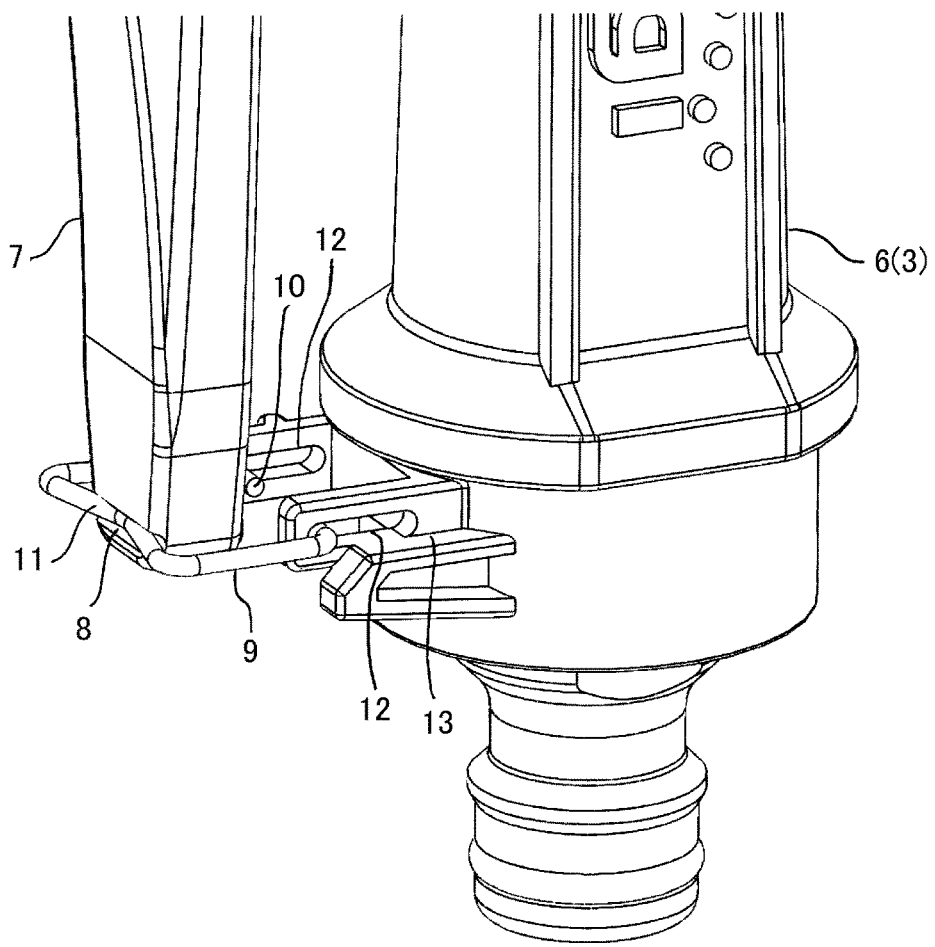
FIG. 5 is a partly enlarged view showing the water spray nozzle locked in a valve open condition.

Upon releasing the grip on the operating lever 7 at this point, the operating lever 7 tends to move away from the nozzle main body 6 by the biasing force of the coil spring. As shown in FIG. 5, the locking portion 11 of the stopper 9 thus engages with the lock recess 8 of the operating lever 7, and the stopper 9 moves to the front position while remaining in the locked position. Since the stopper 9 is incapable of moving in front of the front position, the operating lever 7 is also incapable of moving further away from the nozzle main body 6, and is locked in the valve open condition.

Squeezing the operating lever 7 slightly from this condition disengages the locking portion 11 from the lock recess 8. However, since the stopper 9 is maintained in the front position and is pivotable, the stopper 9 pivots by the weight of the locking portion 11 into the non-lock position.

Subsequently letting go of the operating lever 7 causes the water spray nozzle 1 to return to the valve closed condition by the biasing force of the coil spring (FIG. 2).

Figure 11:
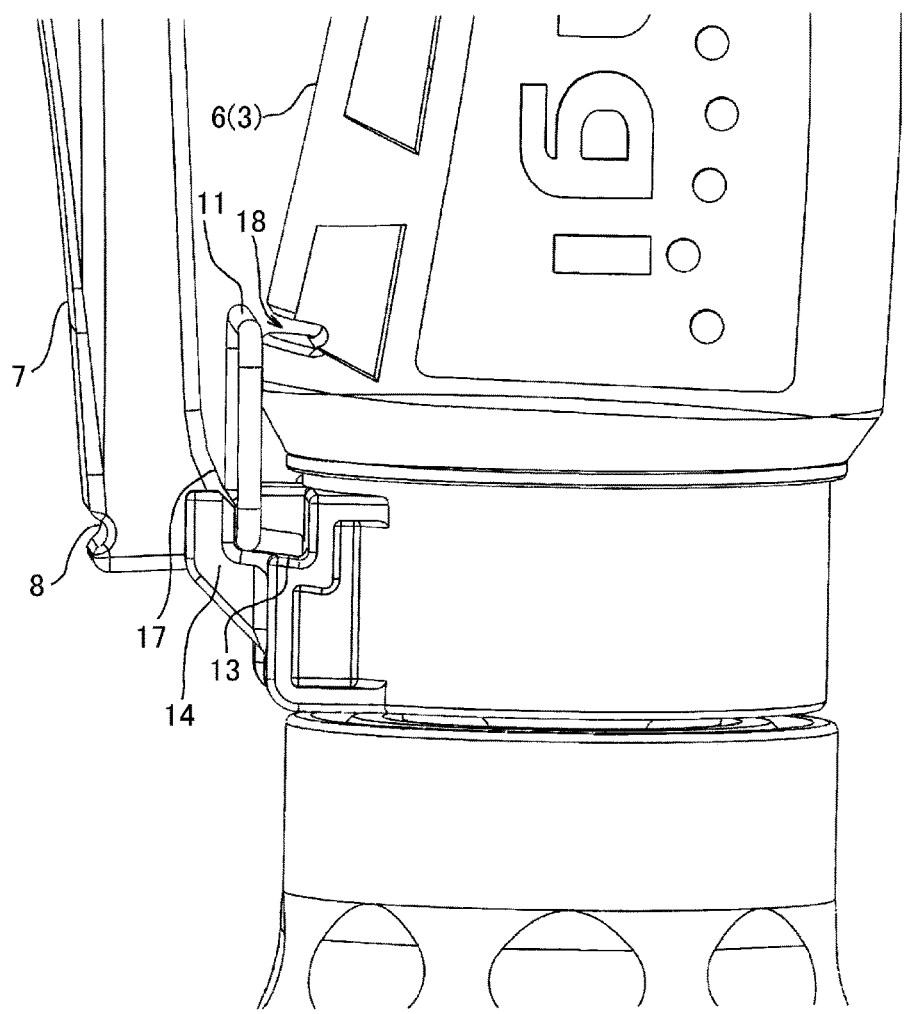
FIG. 11 is a partly enlarged view showing the stopper of the water spray nozzle in a retracted position.

In this water spray nozzle 1, when the user does not wish to lock the operating lever 7, the locking portion 11 of the stopper 9 may be pivoted upward and kept in the retracted position while in the valve closed condition (see, FIG. 11). This enables the degree of opening of the on-off valve to be adjusted freely without locking the operating lever 7.

The stopper 9 is kept in the retracted position by the frictional force between the stopper 9 and the rails 12.

In the water spray nozzle 1 of the first embodiment, the stopper 9 is pivoted automatically from the non-lock position to the locked position (FIGS. 3 and 4) and locked in the valve open condition (FIG. 5) by simply squeezing the operating lever 7 from the valve closed condition (FIG. 2) and moving the operating lever 7 toward the nozzle main body 6.

Additionally, to release the lock, the operating lever 7 simply needs to be squeezed slightly and then let go. Thus, the water spray nozzle 1 can be easily operated with one hand.

Further, manual spraying without using the lock can be optionally chosen by pivoting the stopper 9 upward and keeping the stopper 9 in the retracted position while in the valve closed condition (see, FIG. 11).

A simple substantially square frame shape of the stopper 9 also enables the stopper 9 to be manufactured easily and at low cost.

The stopper 9 may be formed in a substantially square frame shape or in a substantially ring shape and engage with the lock recess 8 of the operating lever 7. This configuration improves the strength of the stopper 9 than before and enables the stopper 9 to be less prone to breakage.

The stopper 9 can also be easily replaced in the event of breakage since the stopper 9 is attached to an outside of the nozzle main body 6.

Second Embodiment

The water spray nozzle 1 of the second embodiment has, in addition to the first embodiment, a structure for preventing the stopper 9 from rotating horizontally.

Figure 6:
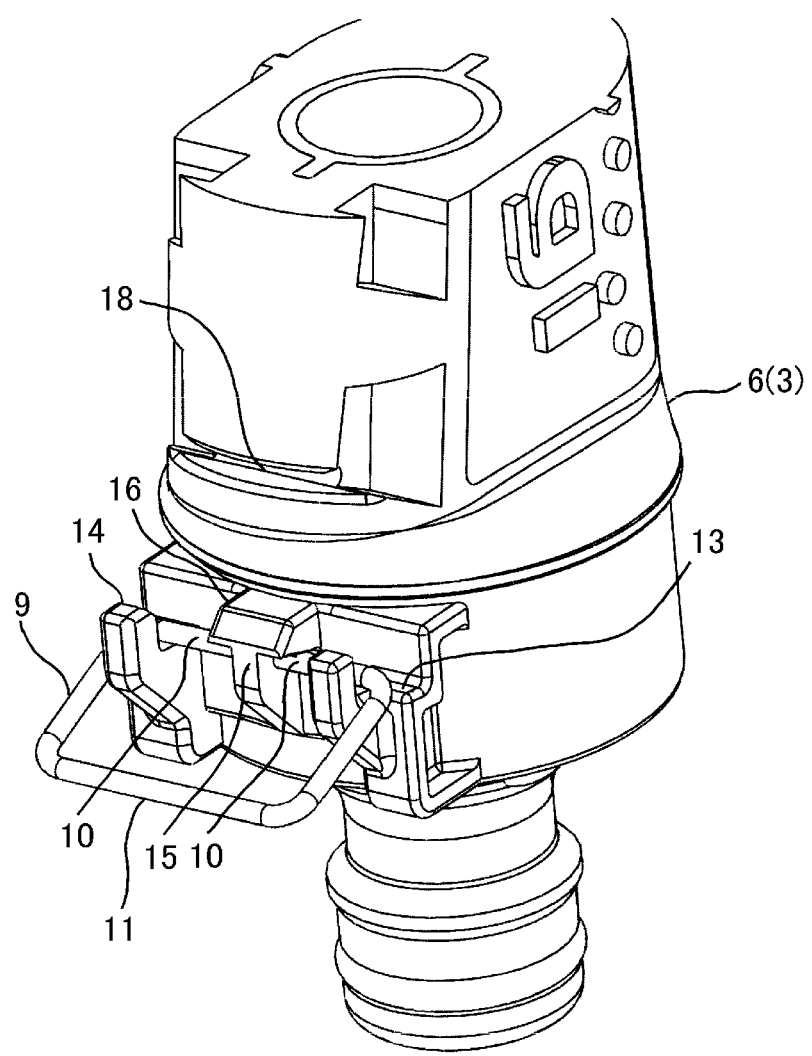
FIG. 6 is a partly enlarged view showing the water spray nozzle according to a second embodiment of the present invention.

As shown in FIG. 6, in the second embodiment, a pair of rail hooks 14, 14 is provided instead of the rails 12 of the first embodiment.

These rail hooks 14 extend forward from the nozzle main body 6 and bend upward at distal ends thereof.

The stopper 9 on the rail hooks 14 can thus slide between the front position and the back position.

The left-to-right width of the rail hooks 14 is substantially equal to the left-to-right width of the inside the frame of the stopper 9.

As shown in FIG. 6, in the center of the left and right rail hooks 14, 14, a stopper restraining portion 15 is provided.

The stopper restraining portion 15 has a left-to-right width that is substantially equal to the cut-away part between the receptacles 10, 10 of the stopper 9 and projects forward from the nozzle main body 6.

When the stopper 9 is attached to the nozzle main body 6, the stopper restraining portion 15 fits exactly between the receptacles 10, 10 of the stopper 9 and inhibits the stopper 9 from rotating horizontally or rattling in a left to right direction.

To inhibit the receptacles 10 from being dislocated from above, the stopper restraining portion 15 is provided with a roof 16 extended in the left to right direction on an upper part of the stopper restraining portion 15.

The horizontal rotation or rattling in the left to right direction of the stopper 9 may prevent the operating lever 7 from being locked or may cause breakage of the stopper 9. However, this water spray nozzle 1 prevents the stopper 9 from rotating horizontally, at any position from the front position to the back position, with the stopper restraining portion 15 being interposed between the receptacles 10, 10, thereby inhibiting movement in the left to right direction.

In the second embodiment, the horizontal planes of the pivoting guide portions 13 are shorter in the front to back direction than the first embodiment.

Figure 7:
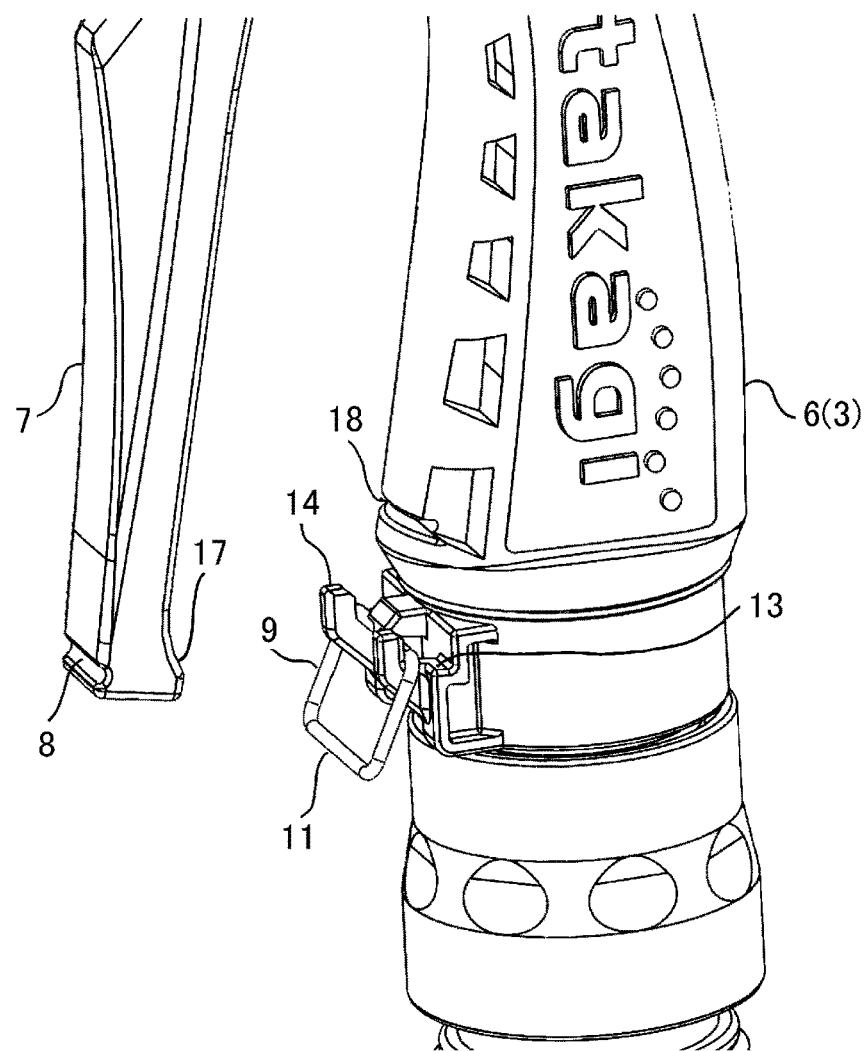
FIG. 7 is a partly enlarged view showing the water spray nozzle in the valve open condition.
Figure 8:
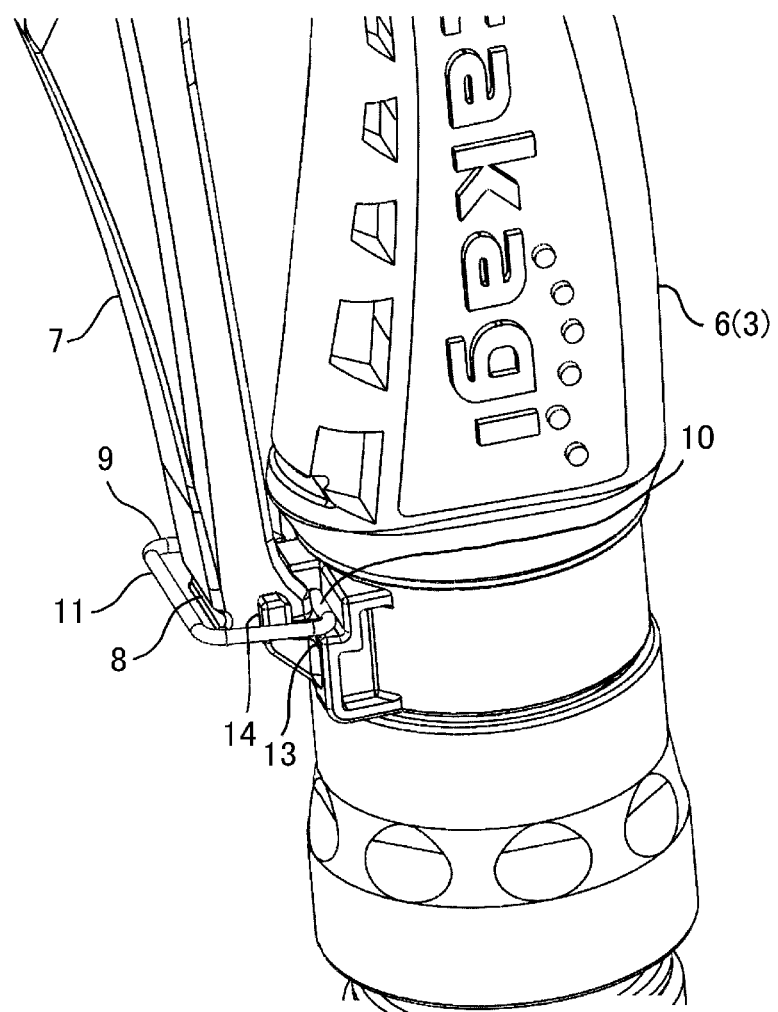
FIG. 8 is a partly enlarged view showing the operating lever of the water spray nozzle in a fully squeezed condition.

Consequently, moving the operating lever 7 toward the nozzle main body 6 to place the stopper 9 in the locked position as shown in FIG. 8, then slowly moving the operating lever 7 away from the nozzle main body 6, causes the stopper 9 to pivot into the non-lock position while sliding forward by the weight of the locking portion 11 before the locking portion 11 engages with the lock recess 8 (FIG. 7).

Figure 9:
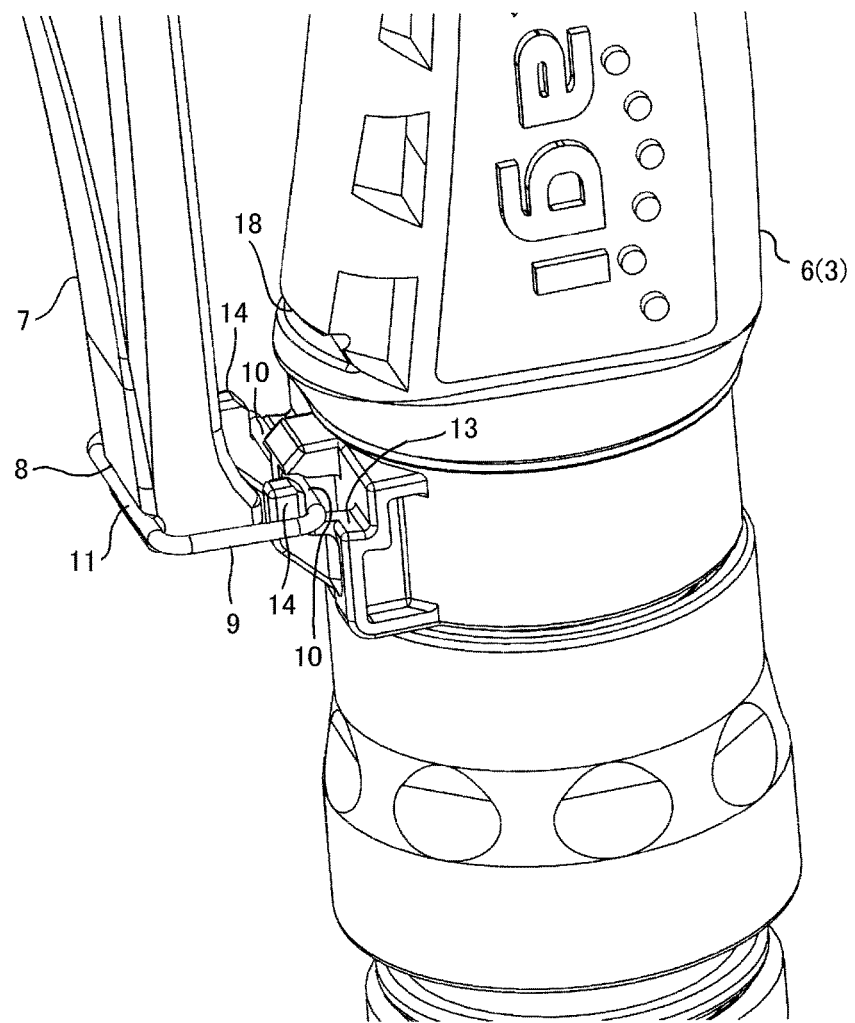
FIG. 9 is a partly enlarged view showing the water spray nozzle locked in the valve open condition.

Using this configuration, control of the water spray nozzle 1 can be easily altered by the user simply changing the degree of squeeze on the operating lever 7. That is, after the user squeezes the operating lever 7 to achieve the valve closed condition (FIG. 8), moving the operating lever 7 quickly away from the nozzle main body 6 allows the operating lever 7 to be locked while maintaining the valve open condition (FIG. 9), whereas moving the operating lever 7 slowly away from the nozzle main body 6 allows the amount of water to be sprayed to be adjusted manually without locking the operating lever 7 (FIG. 7).

The water spray nozzle 1 of the second embodiment also has a structure for preventing breakage of the stopper 9 by being sandwiched between the operating lever 7 and the nozzle main body 6.

Figure 10:
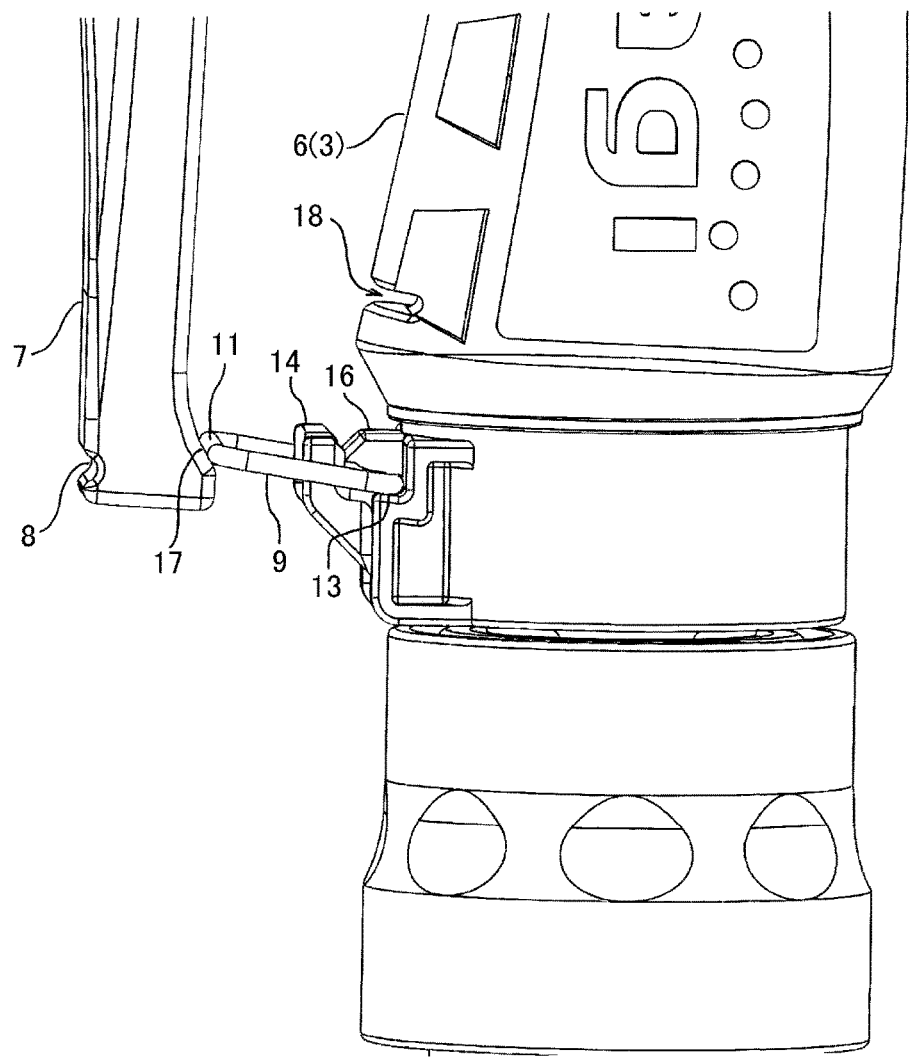
FIG. 10 is a partly enlarged view showing the operating lever of the water spray nozzle beginning to contact the stopper in the locked position.

As shown in FIGS. 7 and 10, the operating lever 7 has, on a lower back surface, a guide ramp 17 that projects gradually backward toward the lower side.

The center of the lower back surface of the operating lever 7 is also recessed toward the front (not shown) so that the operating lever 7 can press the receptacles 10 of the stopper 9 without interfering with the stopper restraining portion 15 as shown in FIG. 8.

As shown in FIG. 10, in the back position, the stopper 9 is kept in the locked position by the pivoting guide portions 13 as in the first embodiment, and the locking portion 11 slants slightly upward from horizontal with respect to the center of pivot.

Squeezing the operating lever 7 when the operating lever 7 is in a position away from the nozzle main body 6 and the stopper 9 is in the locked position in the back position causes the guide ramp 17 of the operating lever 7 to come into contact with the locking portion 11 of the stopper 9 as shown in FIG. 10 and to press the stopper 9 to allow the stopper 9 to automatically pivot into the retracted position (FIG. 11).

As shown in FIG. 10, the locking portion 11 is caused to pivot while sliding along the guide ramp 17. Since the locking portion 11 slants slightly upward due to the pivoting guide portions 13 and the locking portion 11 is scooped up from below due to the shape of the guide ramp 17, the direction in which the operating lever 7 presses the locking portion 11 of the stopper 9 is eccentric relative to a central axis of pivot of the stopper 9 at any position along the pivotal movement. Consequently, pressure by the operating lever 7 is converted into a force for pivoting the stopper 9 so that load does not concentrate on the stopper 9 by being dead center and breakage of the stopper 9 is prevented.

As shown in FIGS. 7 and 11, the nozzle main body 6 has a retention recess 18, which is a groove extending in the left to right direction, engraved above the rail hooks 14 and the stopper restraining portion 15.

Figure 12:
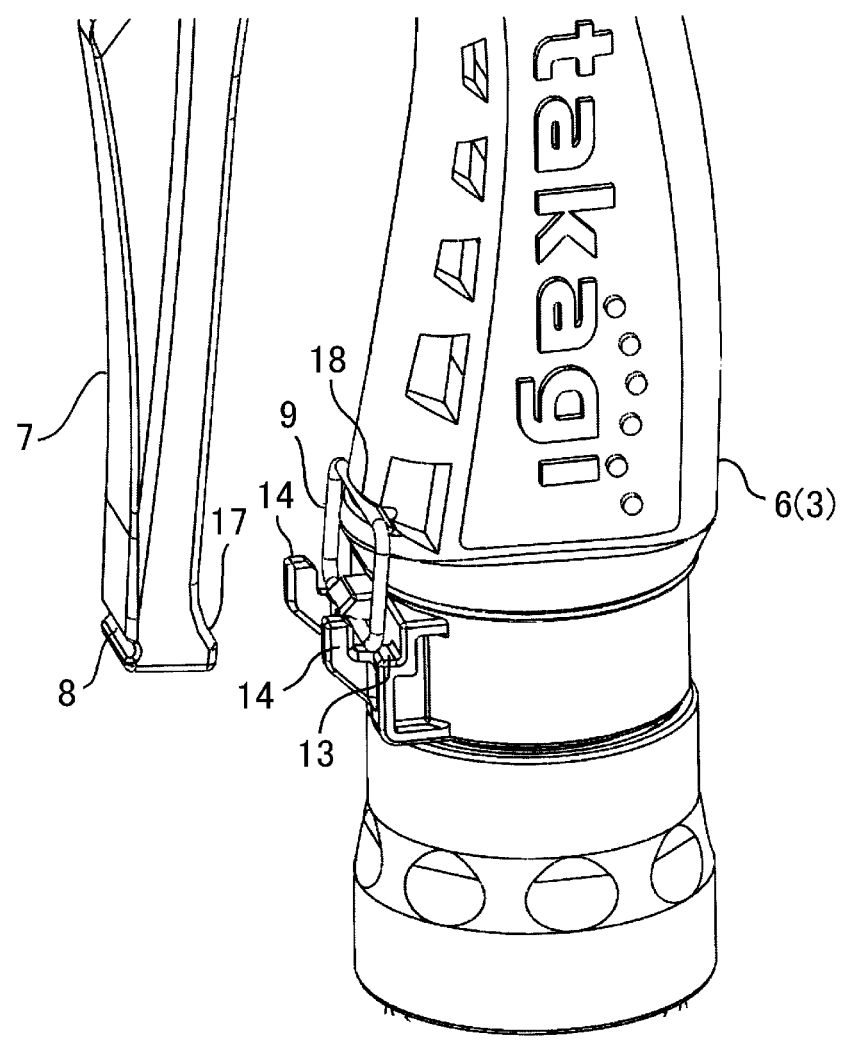
FIG. 12 is another partly enlarged view showing the stopper of the water spray nozzle in the retracted position.

Thus, when the stopper 9 is in the retracted position and the locking portion 11 engages with the retention recess 18 as shown in FIG. 12, the stopper 9 can be secured in the retracted position without pivoting downward.

When the stopper 9 is retained in the retention recess 18, the user can easily pull out the stopper 9 from the retention recess 18 by pulling the stopper 9 with his or her fingers.

Providing the retention recess 18 further ensures the stopper 9 to be kept in the retracted position.

Third Embodiment

The third embodiment is characterized in that the locking of the operating lever 7 by the locking portion 11 is facilitated in the second embodiment after the water spray nozzle 1 is in the valve open condition and between when the stopper 9 assumes the locked position and when the stopper 9 pivots into the non-lock position.

For the third embodiment, as shown in FIG. 13, the shape of a decorative lid 21 disposed opposite the operating lever 7 from the valve body 19 of the on-off valve has been adjusted so that when the operating lever 7 is squeezed to a predetermined position, the valve body 19 pushed by the operating lever 7 comes into contact with the decorative lid 21, preventing the operating lever 7 from moving any closer to the nozzle main body 6.

Thus, when the user squeezes the operating lever 7 to the limit, the operating lever 7 stops at a position slightly further away from the nozzle main body 6 compared to the first and second embodiments.

In this position, the stopper 9 is also pushed to the back position into the locked position.

When the user subsequently releases the operating lever 7, the operating lever 7 tends to move away from the nozzle main body 6 by the biasing force of the coil spring 20. However, because the operating lever 7 stops at a position slightly further away from the nozzle main body 6 and the distance between the lock recess 8 and the locking portion 11 is shorter, the locking portion 11 engages with the lock recess 8 and locks the operating lever 7 before the stopper 9 pivots into the non-lock position under its own weight.

Figure 14:
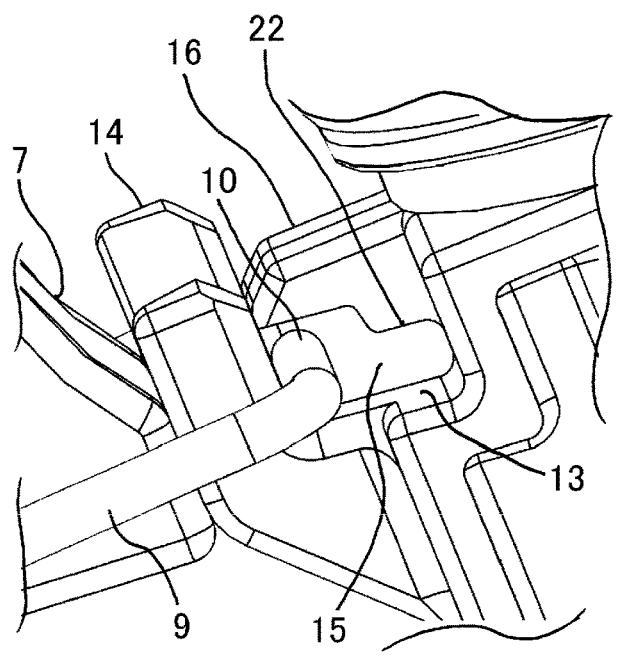
FIG. 14 is a partly enlarged view showing another example of the water spray nozzle according to the third embodiment of the present invention.

Instead of changing the shape of the decorative lid 21, a stepped portion 22 projecting downward from the roof 16 may be provided as shown in FIG. 14.

The height of the gap between the stepped portion 22 and the pivoting guide portions 13 is substantially equal to the height of the receptacles 10 of the stopper 9.

With the stepped portion 22 in place, when the operating lever 7 moves toward the nozzle main body 6 and the stopper 9 is pushed to the back position into the locked position, the receptacles 10 are sandwiched between the stepped portion 22 and the pivoting guide portions 13.

When the user subsequently releases the operating lever 7, the operating lever 7 tends to move away from the nozzle main body 6 by the biasing force of the coil spring 20. However, because the stopper 9 is prevented from pivoting into the non-lock position by the frictional force between the receptacles 10, and the stepped portion 22 and the pivoting guide portions 13, the locking portion 11 engages with the lock recess 8 and locks the operating lever 7.

When the user does not wish to lock the operating lever 7, the user may manually pivot the stopper 9 into the non-lock position or pull the stopper 9 to the front position and allow the stopper 9 to pivot under its own weight.

The water spray nozzle 1 of the third embodiment is capable of reliably locking the operating lever 7 in the valve open condition when the user releases the operating lever 7 after squeezing the operating lever 7.

Variations

As a variation of the second embodiment, instead of placing the stopper restraining portion 15 midway between the receptacles 10, 10, a pair of stopper restraining portions may be disposed further outer left and outer right of the pivoting guide portions 13. The left and right ends of the stopper 9 may be sandwiched between these stopper restraining portions to prevent the horizontal rotation and rattling in the left to right direction of the stopper 9.

As another variation of the second embodiment, in combination with the guide ramp 17 or instead of the guide ramp 17, the back surface of the operating lever 7 may be coated with an elastic material to improve the effects of preventing breakage of the stopper 9.

Although, in the first embodiment and the second embodiment, the water spray nozzle 1 has the operating lever 7 disposed on the front of the grip portion 3 of the nozzle main body 6, the lever lock structure according to an aspect of the present invention may be applied to a nozzle gun in which the operating lever is disposed behind the grip portion 3.

The lever lock structure of the first embodiment and the second embodiment can also be applied to various manual tools or the like, other than nozzle guns.

DESCRIPTION OF REFERENCE SYMBOLS 1 water spray nozzle
2 connection port
3 grip portion
3a hose connector
4 nozzle portion
5 discharge outlet
6 nozzle main body
7 operating lever
8 lock recess
9 stopper
10 receptacles
11 locking portion
12 rails
13 pivoting guide portions
14 rail hooks
15 stopper restraining portion
16 roof
17 guide ramp
18 retention recess
19 valve body
20 coil spring
21 decorative lid
22 stepped portion

What is claimed is:

1. A nozzle gun comprising:
a nozzle main body having a flow path through which a fluid passes and a discharge outlet formed on a distal end of the flow path;
an operating lever attached to the nozzle main body to be movable toward and away from the nozzle main body;
an on-off valve disposed along the flow path and configured to open and close the flow path according to a relative position of the operating lever with respect to the nozzle main body;
a stopper formed in a frame or ring shape and attached to the nozzle main body to be pivotable between a locked position and a non-lock position, the stopper having a locking portion, and receptacles disposed on a movement trajectory of the operating lever;
a grooved lock recess formed on the operating lever; and
pivoting guide portions provided on the nozzle main body, wherein
when the operating lever is moved toward the nozzle main body and places the stopper in the locked position, the locking portion engages with the grooved lock recess of the operating lever to prevent the operating lever from moving away from the nozzle main body,
when the stopper is in the non-lock position, the locking portion does not engage with the operating lever and the operating lever is capable of moving away from the nozzle main body, and
when the operating lever is moved toward the nozzle main body with the stopper in the non-lock position, the receptacles are pressed by the operating lever to cause the stopper to pivot into the locked position while the stopper abuts on the pivoting guide portions.

2. The nozzle gun according to claim 1, wherein when the operating lever is moved toward the nozzle main body from a condition in which the operating lever is in a position spaced from the nozzle main body and the stopper is in the locked position, the operating lever causes the stopper to pivot due to a fact that the direction of the operating lever abutting and pressing the stopper is eccentric relative to a central axis of pivot of the stopper.

3. The nozzle gun according to claim 1, wherein the nozzle main body is further provided with a stopper restraining portion configured to abut on the stopper to prevent the stopper from rattling in a direction intersecting with a direction of pivot of the stopper.

4. A nozzle gun comprising:
a nozzle main body having a flow path through which a fluid passes and a discharge outlet formed on a distal end of the flow path;
an operating lever attached to the nozzle main body to be movable toward and away from the nozzle main body;

an on-off valve disposed along the flow path and configured to open and close the flow path according to a relative position of the operating lever with respect to the nozzle main body;

a stopper attached to the nozzle main body to be pivotable between a locked position and a non-lock position, the stopper having a locking portion, and receptacles disposed on a movement trajectory of the operating lever; and pivoting guide portions provided on the nozzle main body, wherein when the operating lever is moved toward the nozzle main body and places the stopper in the locked position, the locking portion engages with the operating lever to prevent the operating lever from moving away from the nozzle main body, when the stopper is in the non-lock position, the locking portion does not engage with the operating lever and the operating lever is capable of moving away from the nozzle main body, and when the operating lever is moved toward the nozzle main body with the stopper in the non-lock position, the receptacles are pressed by the operating lever to cause the stopper to pivot into the locked position while the stopper abuts on the pivoting guide portions; and wherein the stopper is capable of pivoting to an opposite side of the non-lock position into a retracted position with respect to the locked position, and the nozzle main body is provided with a retention portion on which the stopper abuts when the stopper is in the retracted position to secure the retracted position; and wherein, in the retracted position, the locking portion of the stopper remains spaced apart from the movement trajectory of the operating lever regardless of whether the operating lever is moved toward or away from the nozzle main body.

5. The nozzle gun according to claim 4, wherein when the operating lever is moved toward the nozzle main body from a condition in which the operating lever is in a position spaced from the nozzle main body and the stopper is in the locked position, the operating lever causes the stopper to pivot due to a fact that the direction of the operating lever abutting and pressing the stopper is eccentric relative to a central axis of pivot of the stopper.

6. The nozzle gun according to claim 4, wherein the nozzle main body is further provided with a stopper restraining portion configured to abut on the stopper to prevent the stopper from rattling in a direction intersecting with a direction of pivot of the stopper.

* * * * *